United States Patent
Das

(10) Patent No.: US 12,407,563 B2
(45) Date of Patent: Sep. 2, 2025

(54) SYSTEM, METHOD, AND MEDIUM FOR PROACTIVE MONITORING OF A NETWORK

(71) Applicant: Rakuten Mobile, Inc., Tokyo (JP)

(72) Inventor: Subhankar Das, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/007,464

(22) PCT Filed: Sep. 16, 2022

(86) PCT No.: PCT/JP2022/034756
§ 371 (c)(1),
(2) Date: Jan. 30, 2023

(87) PCT Pub. No.: WO2024/057531
PCT Pub. Date: Mar. 21, 2024

(65) Prior Publication Data
US 2024/0275666 A1   Aug. 15, 2024

(51) Int. Cl.
*H04L 41/0677* (2022.01)
*H04L 41/069* (2022.01)
*H04L 41/5074* (2022.01)

(52) U.S. Cl.
CPC ........ *H04L 41/0677* (2013.01); *H04L 41/069* (2013.01); *H04L 41/5074* (2013.01)

(58) Field of Classification Search
CPC .......................... H04L 41/0677; H04L 41/069; H04L 41/5074
USPC ......................................................... 370/242
See application file for complete search history.

(56) References Cited

U.S. PATENT DOCUMENTS

| | | | | |
|---|---|---|---|---|
| 7,142,820 B1 * | 11/2006 | Rajala | ..................... | H04L 41/22 455/67.7 |
| 7,197,558 B1 * | 3/2007 | Harper | ..................... | H04L 69/40 709/224 |
| 8,462,619 B2 * | 6/2013 | Clemens | ............. | G06F 11/0793 709/224 |
| 8,521,869 B2 * | 8/2013 | Ganesh | ............... | G06F 11/0709 709/224 |
| 9,178,775 B2 * | 11/2015 | Spieser | ............... | H04L 41/5019 |
| 9,973,405 B2 * | 5/2018 | Popokh | .................... | H04L 41/40 |
| 10,057,116 B2 * | 8/2018 | Qu | ......................... | H04L 61/251 |

(Continued)

FOREIGN PATENT DOCUMENTS

| | | | | |
|---|---|---|---|---|
| EP | 0998076 A1 * | 5/2000 | | |
| EP | 1802035 A1 * | 6/2007 | ........... | H04L 41/142 |
| WO | WO-2011137766 A2 * | 11/2011 | ............. | H04L 41/06 |

*Primary Examiner* — Melvin H Pollack
(74) *Attorney, Agent, or Firm* — HAUPTMAN HAM, LLP

(57) ABSTRACT

A network element sends a critical alarm to an element management system, indicating the potential failure of the network element. The network element and critical alarm are verified against existing alarm and identifying information libraries associated with the network element. An incident object including data associated with the critical alarm is generated. A trouble ticket associated with the critical alarm and the network element is then generated, based on the incident object data, in real-time for proactive monitoring of the network and management of the critical alarm at an early stage in order to prevent scaling of a network outage or prevent the outage entirely.

20 Claims, 6 Drawing Sheets

(56) References Cited

U.S. PATENT DOCUMENTS

| | | | |
|---|---|---|---|
| 10,537,290 B2* | 1/2020 | De Waele | G16H 50/50 |
| 10,592,847 B2* | 3/2020 | Scholey | G06Q 10/0833 |
| 10,639,509 B2* | 5/2020 | Skaaksrud | G01C 5/06 |
| 10,665,070 B1* | 5/2020 | Picardi | G08B 25/008 |
| 10,812,316 B2* | 10/2020 | Male | H04L 41/0631 |
| 10,819,594 B2* | 10/2020 | Margalit | H04L 41/22 |
| 10,893,022 B1* | 1/2021 | Li | H04L 45/748 |
| 10,999,128 B2* | 5/2021 | Lehman | H04L 43/0811 |
| 11,050,765 B2* | 6/2021 | Lin | G06F 21/53 |
| 11,050,780 B2* | 6/2021 | Lingafelt | H04L 63/1425 |
| 11,271,816 B2* | 3/2022 | Reehil | H04L 41/0895 |
| 11,483,326 B2* | 10/2022 | Meir | G06N 20/00 |
| 11,489,823 B2* | 11/2022 | Ward | H04L 63/126 |
| 11,509,680 B2* | 11/2022 | Steimberg | H04L 63/02 |
| 11,557,186 B2* | 1/2023 | Saldin | H04W 12/03 |
| 11,580,842 B1* | 2/2023 | Hauser | G08B 21/182 |
| 11,632,320 B2* | 4/2023 | Castle | H04L 43/0817 709/224 |
| 11,734,704 B2* | 8/2023 | Koval | G06N 3/04 700/291 |
| 11,754,997 B2* | 9/2023 | Engelstein | H04Q 9/00 700/291 |
| 11,778,418 B2* | 10/2023 | Castagnoli | H04W 4/026 455/456.1 |
| 11,996,974 B2* | 5/2024 | Wang | H04L 41/0677 |
| 12,088,614 B2* | 9/2024 | Maturana | H04L 63/1425 |
| 2007/0147260 A1* | 6/2007 | Schwarzmann | H04L 41/0686 370/242 |
| 2007/0150939 A1* | 6/2007 | Aaron | H04L 63/126 726/3 |
| 2008/0151767 A1* | 6/2008 | Moran | H04L 41/0253 370/252 |
| 2019/0288907 A1* | 9/2019 | Johnston | H04L 41/145 |
| 2020/0065353 A1* | 2/2020 | Mehring | G06K 19/0723 |
| 2020/0213203 A1* | 7/2020 | Mortensen | G06N 5/02 |
| 2020/0374403 A1* | 11/2020 | Lewinson | H04L 51/23 |
| 2020/0396120 A1* | 12/2020 | Guilbeault | H04L 41/0672 |
| 2022/0239370 A1* | 7/2022 | Abidi | H04B 10/07 |
| 2022/0391500 A1* | 12/2022 | Chen Kaidi | G06F 21/552 |
| 2023/0070701 A1* | 3/2023 | Wang | H04L 41/5012 |
| 2023/0164596 A1* | 5/2023 | Singh | H04W 24/04 370/216 |
| 2024/0113932 A1* | 4/2024 | Castrogiovanni | H04L 41/147 |
| 2024/0179168 A1* | 5/2024 | Manthiramoorthy | H04L 63/1425 |

* cited by examiner

SYSTEM, METHOD, AND MEDIUM FOR PROACTIVE MONITORING OF A NETWORK

RELATED APPLICATIONS

The present application is a National Phase of International Application No. PCT/JP2022/034756, filed Sep. 16, 2022.

TECHNICAL FIELD

The present disclosure relates generally to the field of computer network monitoring, and in particular to the proactive monitoring of computer networks in order to avoid and/or minimize network outages by early detection and notification.

BACKGROUND

As electronic communication networks to advance and grow, increasing network density and complexity can put pressure on Network Operation Centers (NOCs) to respond ever more quickly to network alarms, even to the point where response times to network events are insufficient to prevent certain types of network outages.

In an example of an existing NOC setup, statuses of network operations are displayed (e.g., on a monitor), a network engineer or engineers may observe one or more computer screens, interpret the data, and contact the serviced client if they believe the displayed data may cause a network incident. An example of a network incident is a server reboot that causes a network outage. A server reboot can be triggered, for example, when software and/or hardware resource usage exceeds the capacity of corresponding hardware and/or software. A network outage can cause interruption of network services and/or network access ranging, for example, from minor to catastrophic. Depending on network size, type and complexity, existing methods of network monitoring may cause errors in the identification of network problems. Response times may also be affected, increasing the probability of a network outage and/or the scaling of the network outage from a relatively small incident to a relatively large incident impacting, and possibly frustrating, a greater number of network users.

Existing NOCs may also have difficulty discovering a network outage in an early stage, when the outage is relatively small or when certain warning signs are evident, but go unnoticed, prior to the outage. As a result, outages or the warning signs of the outages may continue to worsen, undetected, until a larger outage occurs. These larger outages can reduce customer confidence in the networks, causing loss of business among other issues.

BRIEF DESCRIPTION OF DRAWINGS

The present disclosure can be understood from the following detailed description when read with the accompanying figures. Unless otherwise specified, various features are not drawn to scale and are used for illustration purposes only. Moreover, the dimensions of various features may be increased or decreased for clarity purposes.

DETAILED DESCRIPTION

Figure 1:
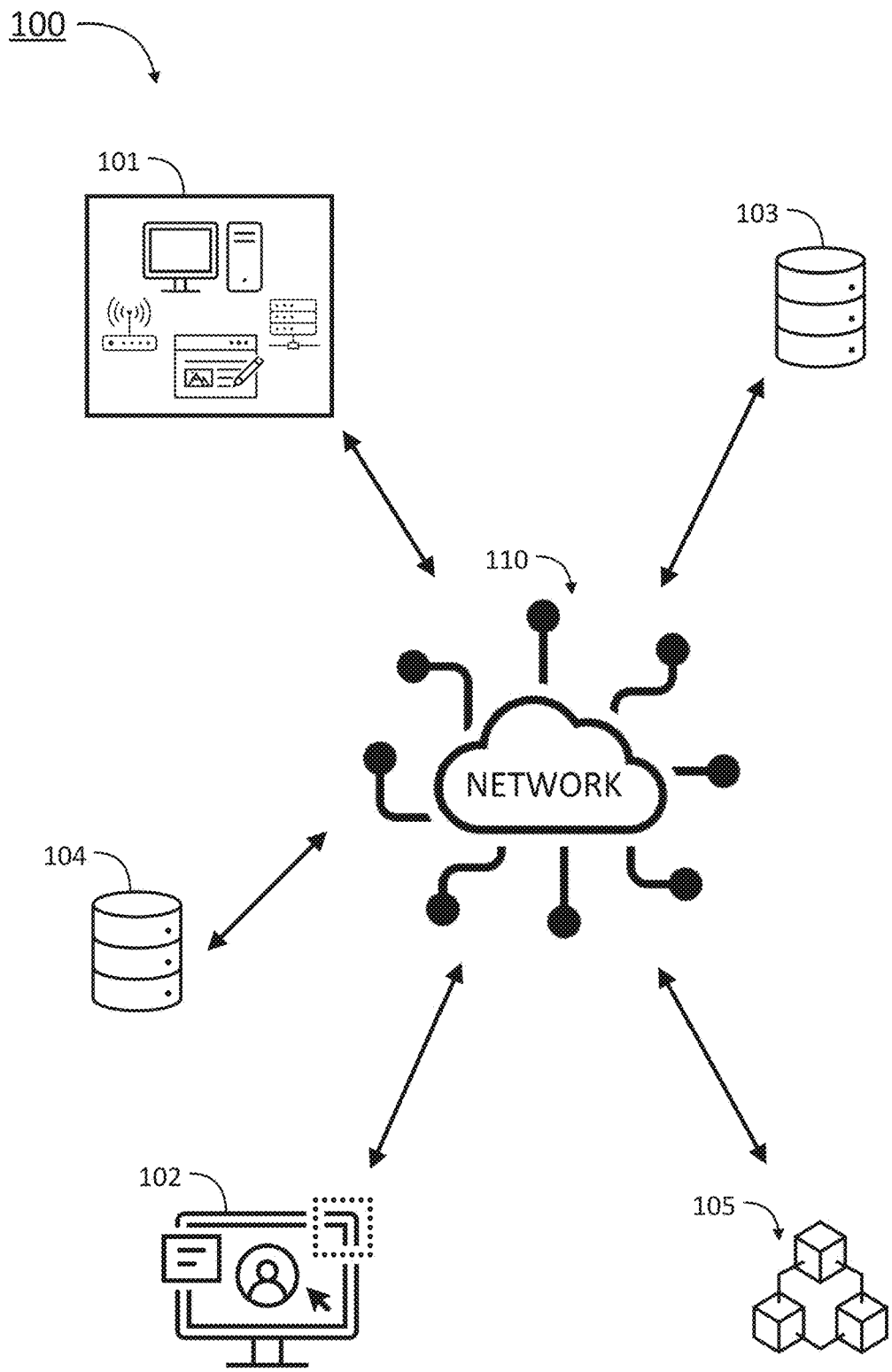
FIG. 1 is a network diagram of an exemplary system suitable for proactive monitoring of a network in accordance with at least one embodiment.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, a network connection of a first feature to a second feature in the description that follows may include embodiments in which the first and second features are directly connected, and may also include embodiments in which additional features may be connected between the first and second features, such that the first and second features may not be in direct connection. In addition, the present disclosure may repeat reference numerals and/or letters in the various examples. This repetition is for the purpose of simplicity and clarity and does not in itself dictate a relationship between the various embodiments and/or configurations discussed.

After careful review and consideration, the inventor devised a solution based on a proactive monitoring system method, and medium, which is/are capable of raising warnings before a network incident happens and/or before a network incident grows into a large network outage, so that the network incident can be resolved in quickly and efficiently versus existing methods and systems.

For example, via proactive monitoring, a smaller incident management team can be implemented to manage a significantly larger amount of network resources compared to traditional methods and systems. All network nodes can be monitored in real-time and notification messages can be generated and sent to the appropriate recipients in real-time. This results in incident teams being able to resolve network issues quickly before an outage occurs or before a small outage can scale to a larger outage. Additionally, the solution can be readily scaled to networks of increased size and complexity.

In at least one embodiment, a system for proactive monitoring of a network is provided, including a memory storing instructions, and at least one processor configured by the instructions to perform specific operations which enable the real-time identification of issues affecting network elements connected to the network being monitored. For example, an issue with a network element (e.g., hardware and/or software connected to the network) can be identified, verified, and a trouble ticket for the issue's resolution can be issued in real-time.

In at least one embodiment, a system performs the operations of receiving, by an element management system (EMS) connected to the network, from a network element connected to the network, a critical alarm indicative of a potential failure of the network element, determining, in response to receiving the critical alarm, whether the critical alarm is a valid alarm associated with the network element, and determining, in response to receiving the critical alarm, whether the network element is a valid network element associated with the network based on a unique identifier associated with the network element.

In at least one embodiment the critical alarm includes a network element identifier comprising data for identifying the network element. In at least one embodiment, the critical alarm is determined to be valid if the critical alarm is found when compared with an alarm library storing critical alarms associated with network elements that are permitted to be connected to the network. In at least one embodiment, the network element is determined to be valid if at least one network element identifier associated with the network element is found when comparing the network element identifier with a network inventory library storing network e element identifiers associated with network elements that are permitted to be connected to the network. In at least one embodiment, a unique identifier may include one or more of: an internet protocol (IP) address associated with the network element, a serial number associated with the network element, any manufacturer information associated with the network element, any vendor information associated with the network element, a geo-location associated with the network element (e.g., a geo-location of the network element at any time while connected to the network and/or a predetermined location of the network element), or other suitable information that allows for sufficient identification of the network element.

The system further generates, in response to a determination that both the critical alarm and the network element are valid, an incident object that includes data associated with the critical alarm, and generates, based on the incident object, a trouble ticket including data associated with the network element, the critical alarm, and the network element identifier data. The system is also capable of sending the generated trouble ticket to at least one predetermined recipient, in order to resolve the identified network element issue raised by the critical alarm. A recipient may be a human user and/or a computer system. In at least one embodiment, the system may generate the incident object in response to a determination that either the critical alarm or the network element are valid. In at least one embodiment, an incident object may be generated in response to a determination that data other than the critical alarm or the network element are valid.

FIG. 1 is a diagram of a network environment 100, suitable for proactive monitoring of a network in accordance with at least one embodiment. The network environment 100 includes network elements (abbreviated "NE") 101, element management system (abbreviated "EMS") 102, alarm library 103, inventory data library 104, and one or more application servers 105 (see also FIG. 5), where the above elements 101-105 are connected to network 110, which can be cloud-based, with decentralized software and hardware, or a standard computer network, or any suitable combination thereof. Network elements can be connected via wireless, wired connections, or any suitable combination thereof.

Network elements 101 include, but are not limited to: one or more physical or virtualized hardware suitable for providing services for Dynamic Host Configuration Protocol (DHCP), Domain Name System (DNS), sending and receiving API calls, including Representational State Transfer (REST) API calls, gateway hardware such as System Architecture Evolution Gateways (SAEGW), Authentication, Authorization, and Accounting (AAA) hardware, Digital Certificate Management (DCM) hardware, standard networking server and cloud networking server hardware, radio cells, aggregator nodes, and the like.

Element management system 102 can be any number of suitable element management systems such as CISCO™ Evolved Programmable Network Manager (EPNM) for cloud systems management, CISCO™ Nexus Dashboard Fabric Controller (NDFC), NOKIA™ NetAct for configuration management, monitoring and software management supporting mobile radio and core, Wi-Fi, Internet of Things (IoT), and the like.

Figure 2:
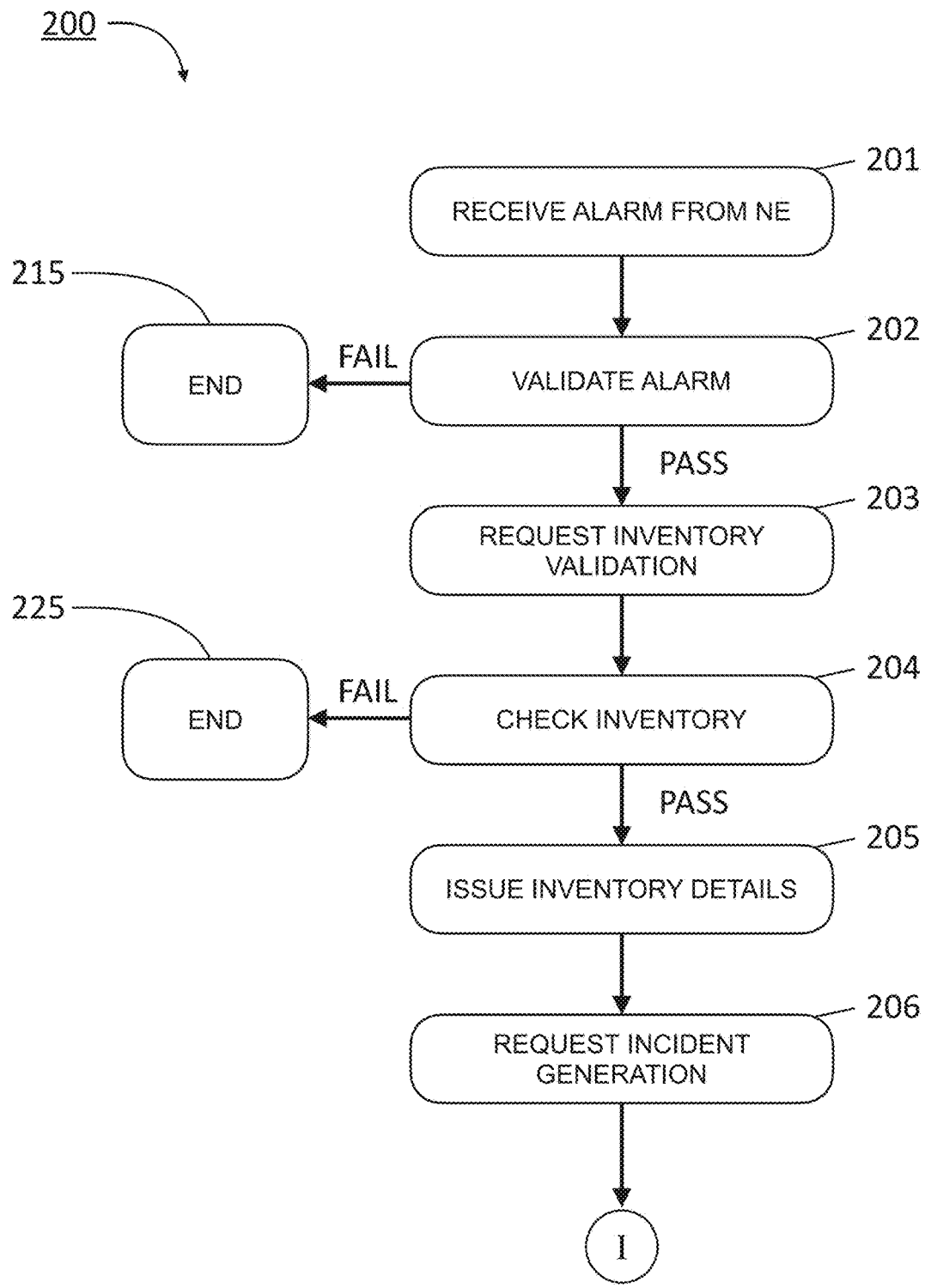
FIG. 2 is a flowchart of exemplary operations suitable for proactive monitoring of a network in accordance with at least one embodiment.
Figure 3:
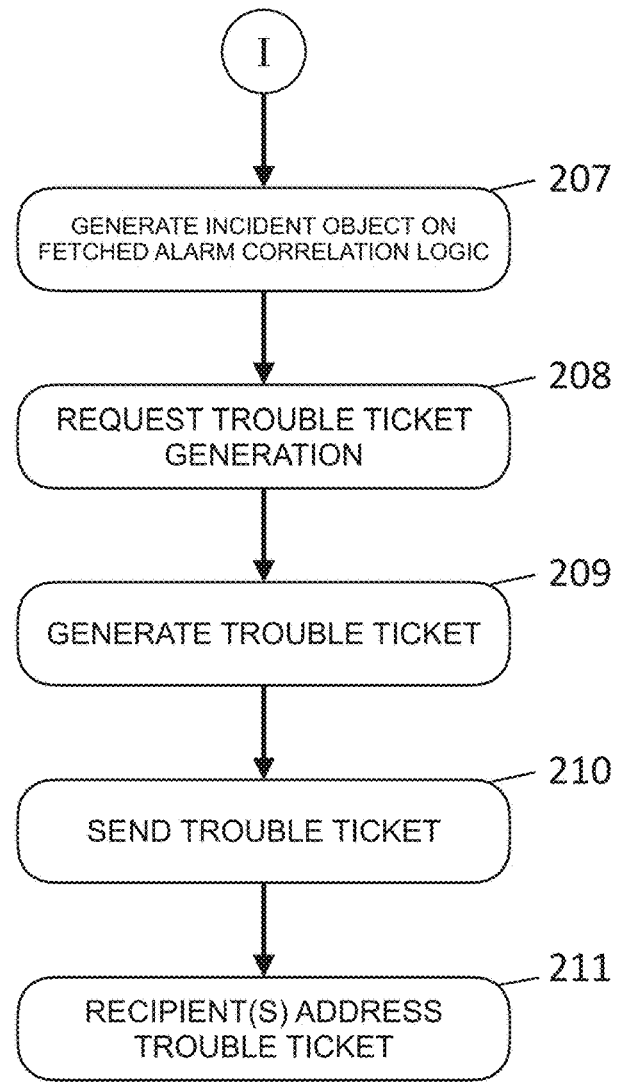
FIG. 3 is a flowchart of exemplary operations suitable for proactive monitoring of a network in accordance with at least one embodiment.

FIGS. 2-3 are a flowchart of exemplary operations of a method 200, suitable for proactive monitoring of a network, in accordance with at least one embodiment. The method 200 includes operations 201, 202, 203, 204, 205, 206, 207, 208, 209, 210, 211, 215, and 225. By way of example and not limitation, the method 200 may be described herein as being performed by one or more of any of the devices, modules, and databases of FIGS. 1, 5, and 6.

In operation 201, a critical alarm is received from a network element connected to the network, for example, by an element management system connected to the network and the network element. The critical alarm can be a network management protocol (NMP) message, for example, an unsolicited network communication such as a Simple Network Management Protocol (SNMP) Trap message. The critical alarm may be issued based on predetermined metrics such as disk usage limits, network traffic limits, memory usage limits, power consumption limits, temperature limits, and the like which, when exceeded can cause a failure of the network element by triggering an emergency shutdown or reboot of the network hardware, thus causing a network outage. Responding to the critical alarm as quickly as possible can prevent network outage entirely or minimize the size of an outage.

In operation 202, the received critical alarm is validated, for example, by comparison with known and valid alarms that have already been configured for the network. In at least one embodiment, determining whether the critical alarm is a valid alarm includes comparing the received critical alarm with an alarm library 103 associated with the network 110, and determining the critical alarm is valid when the received critical alarm is found also recorded in the alarm library (see, for example, "PASS" after operation 202 in FIG. 2)

However, the received critical alarm will be determined to be invalid if the critical alarm is not found in the alarm library, at which point, the received critical alarm is discarded and ignored (see, for example, "FAIL" and operation 215 in FIG. 2).

Upon validation of the received critical alarm, (indicated as "PASS" after operation 202 in FIG. 2) a request for validation of a network element identifier associated with the network element is made in operation 203. In operation 204, in response to the request, stored network element identifiers representing network elements that are permitted to be on the network are then compared to the network element identifier of the network element for which the request was issued, and if a match is found between the stored network element identifiers and the identifier of the network element that sent the critical alarm (indicated as "PASS" after operation 204 in FIG. 2), the data associated with the network element is issued (operation 205) for use in a request for generation of an incident object (operation 206). In response to the request for generation of the incident object, alarm correlation logic is fetched and the incident object is then generated based on the fetched alarm correlation logic (i.e., operation 207 in FIG. 3). Data associated with the network element may include the network element identifier, an internet protocol (IP) address associated with the network element, a serial number associated with the network element, any manufacturer information associated with the network element, any vendor information associated with the network element, a geo-location associated with the network element (e.g., a geo-location of the network element at any time while connected to the network and/or a predetermined location of the network element), or other suitable information that allows for sufficient identification of the network element.

The network element identifier will be determined to be invalid if the identifier is not found in the network element identifier library, at which point, the received critical alarm is discarded and ignored (see, for example, "FAIL" and operation 225 in FIG. 2).

In FIG. 3, operation 207 includes generating an incident object based on the fetched alarm logic for the validated critical alarm. In this application, alarm logic includes information relating to response actions that can be taken to resolve the issue that triggered the critical alarm. The incident object includes data associated with the critical alarm. In operation 208, a request is issued to generate a trouble ticket, based on the incident object, where the trouble ticket includes data associated with the network element, the critical alarm, and the at least one network element identifier. The trouble ticket is generated in operation 209. The trouble ticket is then sent to at least one predetermined recipient in operation 210. A recipient can be, for example, a NOC engineer or the like. Then, the issue with the network element can be addressed and resolved according to the information included in the trouble ticket (operation 211).

The various requests presented in FIGS. 2 and 3 can be made using any suitable messaging regime, for example, API calls, SNMP messaging and the like.

Figure 4:
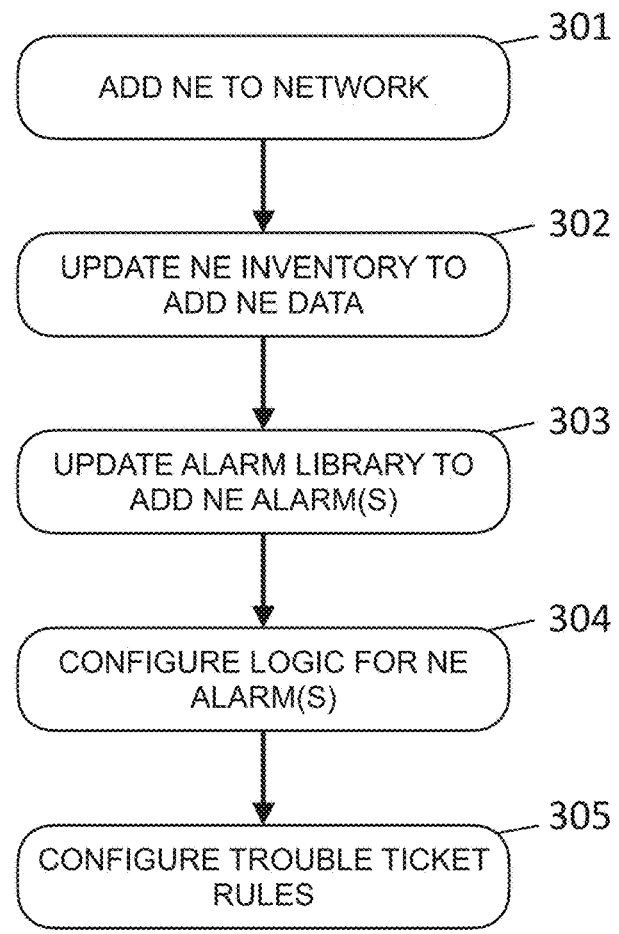
FIG. 4 is a flowchart of exemplary operations suitable for proactive monitoring of a network in accordance with at least one embodiment.

FIG. 4 is a flowchart of exemplary operations of a method 300, suitable for use in proactive monitoring of a network, in accordance with at least one embodiment. The method 300 includes operations 301, 302, 303, 304, and 305. By way of example and not limitation, the method 300 may be described herein as being performed by one or more of any of the devices, modules, and databases of FIGS. 1, 5, and 6.

In operation 301, a new network element is added to the network. For example, a new network node (e.g., radio tower, microwave antenna, etc.), a new server, personal computer (PC), router, gateway, virtual and/or physical hardware that did not previously have network access. In operation 302, at least one network element identifier associated with the new network element is added to a network inventory library accessible to the network, thereby updating a collection, contained within the network inventory library, of network element identifiers defining network elements that are permitted on the network. In operation 303, one or more alarms associated with the new network element are added to the network's alarm library, which contains network alarms of network elements permitted on the network, thereby updating the alarm library for the network. In operation 304, specific logic for the one or more alarms associated with the network element can be configured automatically, or by a user. In operation 305, the rules for handling trouble tickets are set. For example, rules for handling trouble tickets can be procedures determined by network operators for responding to one or more critical alarms that can be issued by a new network element. It is to be noted that operations 302 and 303 may be carried out in any order or simultaneously.

Figure 5:
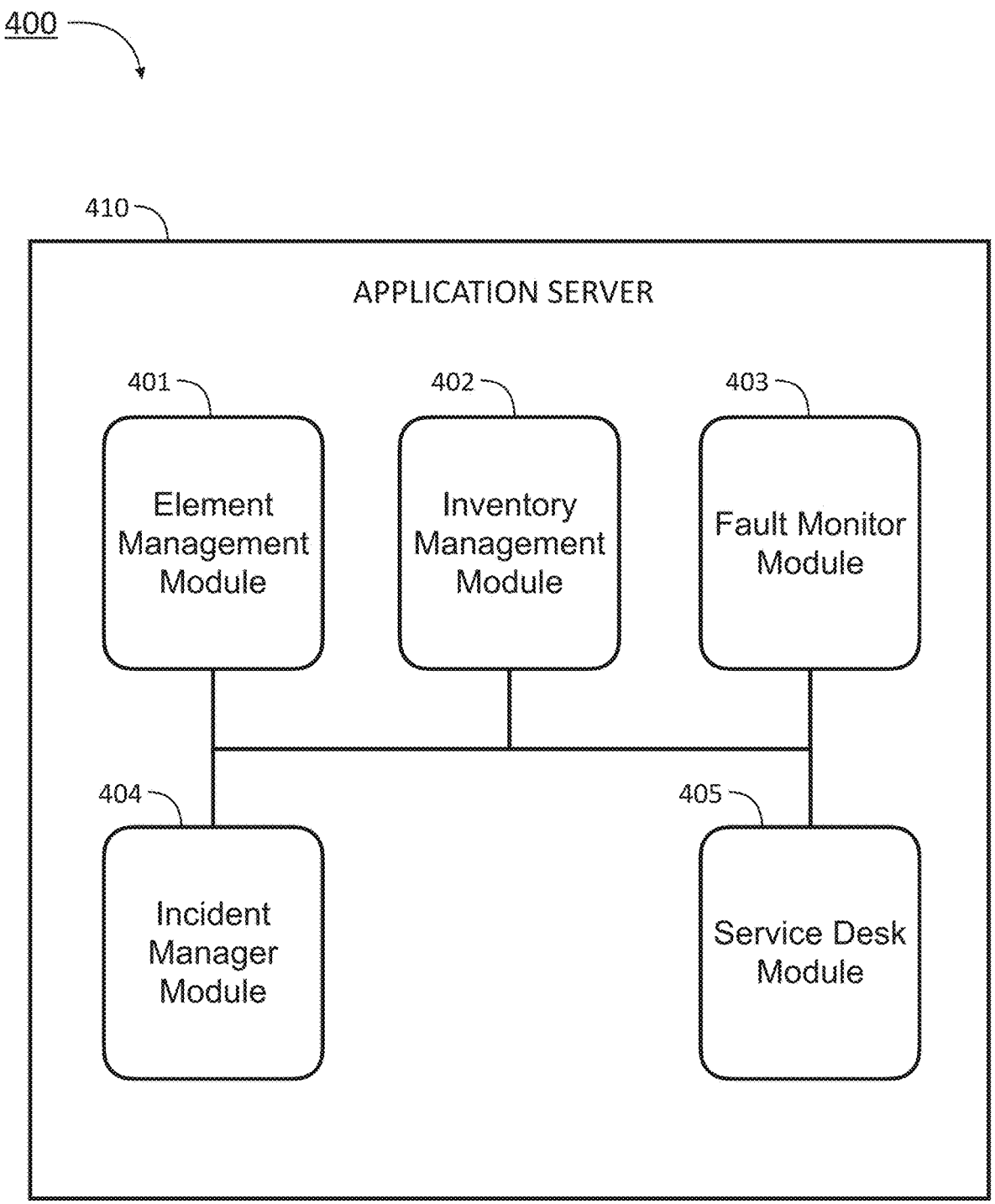
FIG. 5 is a block diagram of an application server suitable for proactive monitoring of a network in accordance with at least one embodiment.

FIG. 5 is a block diagram 400 of an application server 410 suitable for use in proactive monitoring of a network in accordance with at least one embodiment. The application server 410 includes an element management module 401, an inventory management module 402, a fault monitor module 403, an incident manager module 404, and a service desk module 405. All of these modules are configured to communicated with each other via any suitable method (e.g., via a network, shared memory space, and the like). Further, any of the modules may be implemented via hardware (e.g., by a single machine or distributed hardware), virtualized hardware, and/or application software running on a single machine or multiple machines. Further, one or more of modules 401-405 may be combined into a single module in any combination and/or have any one or more operations of these modules distributed among one another in any suitable configuration.

In at least one embodiment, element management module 401 is connected to all of the network elements on the network and receives critical alarms from network elements. The inventory management module 402 contains network element identifiers and other data associated with network elements such as vendor information, serial numbers, unique host names, and IP addresses, and is configured to update this information when needed, for example, when a new network element is added to the network. The fault monitor module 403 includes the alarm library for the network and is configured to monitor, in real-time, critical alarms that are received by element management systems (EMSs) on the network. The incident manager module 404 is configured to manage correlations of particular critical alerts with actions that are to be taken to resolve the network issues associated with the critical alerts. These configurations can be set automatically or manually, for example, by computer hardware and/or software, a domain team of network engineers or other user. The service desk module 405 provides operations for the automatic generation of trouble tickets, according to preconfigured settings. The service desks module also determines how trouble tickets are to be routed (e.g., via messaging protocols, email, etc.) and the recipients to which the messages are routed.

Figure 6:
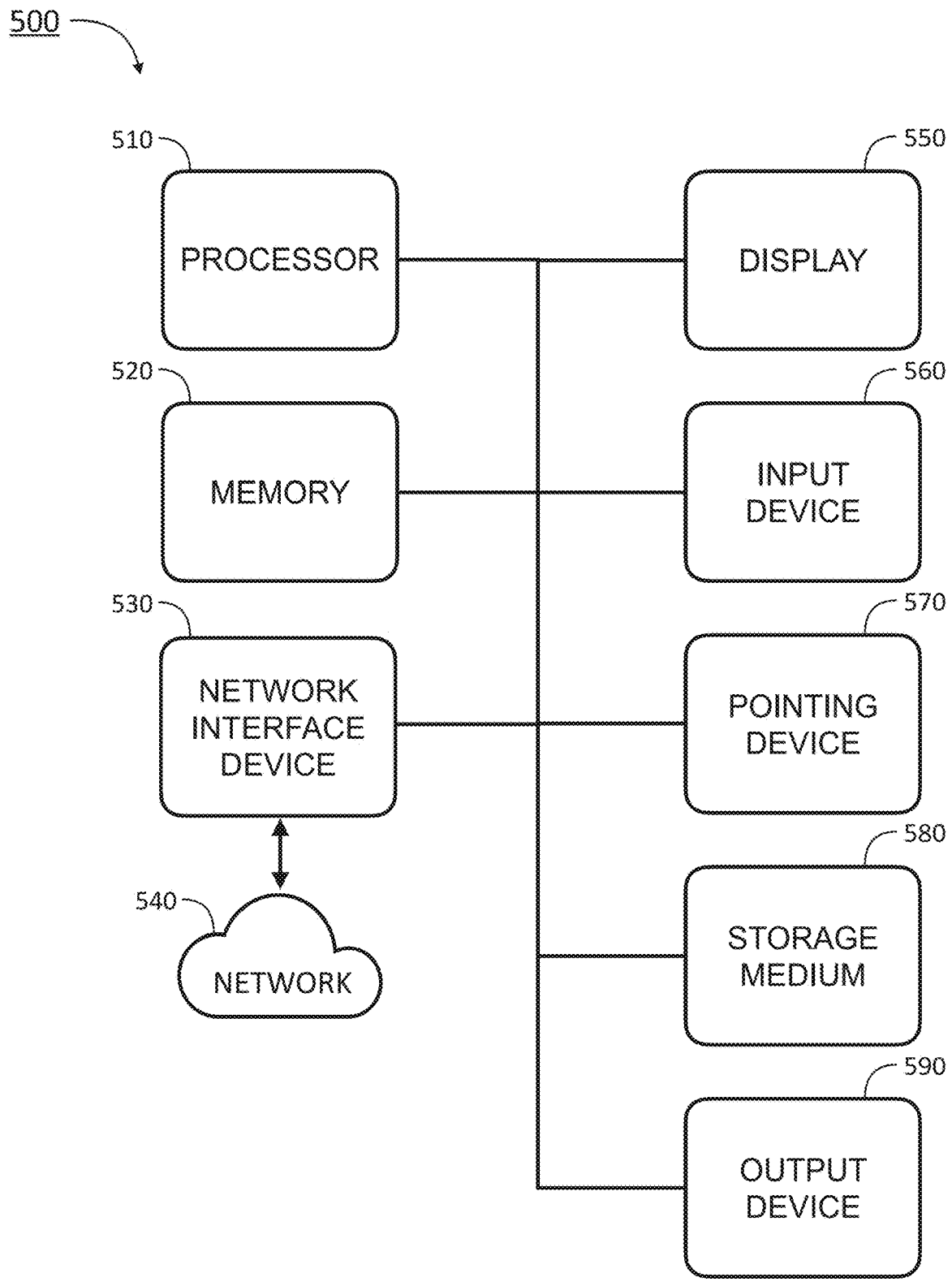
FIG. 6 is a block diagram of an electronic device suitable for proactive monitoring of a network in accordance with at least one embodiment.

FIG. 6 is a block diagram of components of electronic device 500, according to at least one embodiment, configured to read instructions from a non-transitory computer-readable medium (e.g., machine-readable and/or computer-readable) and perform any of the operations disclosed herein, in whole or in part. The electronic device includes at least one or more of: a processor 510, a memory 520 (e.g., RAM/ROM), a network interface device 530 (e.g., ethernet connection, wireless connection, etc) configured to connect to a network 540 (e.g., LAN, WAN, mobile network, wired or wireless), a display 550 (e.g., LCD, LED, OLED, CRT, etc.), an input device 560 (e.g., keyboard, touchscreen, etc.), a pointing device 570 (e.g., mouse, trackpad, tablet, motion-control device, etc.), a storage medium 580 (e.g., hard drive, optical drive, solid-state storage device), and an output device 590 (e.g., audio, optical output, etc.). The components of electronic device 500 may be any suitable combination of physical hardware or virtualized hardware, and/or contained within one device or spread across multiple devices or application platforms.

The invention claimed is:

1. A system for proactive monitoring of a network, the system comprising:
   a memory that stores instructions; and
   at least one processor configured by the instructions to perform operations comprising:
   receiving, by an element management system connected to the network, from a network element connected to the network, a critical alarm indicative of a potential failure of the network element;
   determining, in response to receiving the critical alarm, whether the critical alarm is a valid alarm associated with the network element by comparing the received critical alarm with an alarm library associated with the network;
   determining, in response to receiving the critical alarm, whether the network element is a valid network element associated with the network based on at least one network element identifier associated with the network element by comparing the at least one network element identifier of the network element with a network inventory library associated with the network;
   generating, in response to a determination that both the critical alarm and the network element are valid, an incident object by identifying logic response actions for resolving the critical alarm, the incident object comprising data associated with the critical alarm;
   generating, based on the incident object, a trouble ticket, the trouble ticket comprising data associated with the network element, the critical alarm, and the at least one network element identifier; and
   sending the generated trouble ticket to at least one pre-determined recipient.

2. The system of claim 1, wherein the determining the critical alarm is a valid alarm comprises:
   determining the critical alarm is valid when the received critical alarm is found in the alarm library; and
   determining the critical alarm is invalid when the critical alarm is not found in the alarm library, wherein
   the received critical alarm is discarded in response to the determination the received critical alarm is invalid.

3. The system of claim 1, wherein the determining the network element is a valid network element comprises:
   determining the network element is valid when the at least one network element identifier is found in the network inventory library; and
   determining the network element is invalid when the at least one network element identifier is not found in the network inventory library, wherein
   the received critical alarm is discarded in response to a determination that the network element is invalid.

4. The system of claim 1, wherein the determining the critical alarm is a valid alarm is triggered by a Network Management System (NMS) message.

5. The system of claim 1, wherein the determining the network element is a valid network element is triggered by an Application Program Interface (API) call.

6. The system of claim 1, wherein the at least one network element identifier comprises one or more of: an internet protocol (IP) address associated with the network element, a serial number associated with the network element, vendor information associated with the network element, manufacturer information associated with the network element or a geo-location associated with the network element.

7. The system of claim 3, wherein the network inventory library or alarm library is stored in a database.

8. A computer-implemented method for proactive monitoring of a network, the method comprising:
   receiving, by an element management system connected to the network, from a network element connected to the network, a critical alarm indicative of a potential failure of the network element;
   determining, in response to receiving the critical alarm, that the critical alarm is a valid alarm associated with the network element by comparing the received critical alarm with an alarm library associated with the network;
   determining, in response to receiving the critical alarm, that the network element is a valid network element associated with the network based on at least one network element identifier associated with the network element by comparing the at least one network element identifier of the network element with a network inventory library associated with the network;
   generating, in response to a determination that both the critical alarm and the network element are valid, an incident object by identifying logic response actions for resolving the critical alarm, the incident object comprising data associated with the critical alarm; and
   generating, based on the incident object, a trouble ticket, the trouble ticket comprising data associated with the network element, the critical alarm, and the at least one network element identifier; and
   sending the generated trouble ticket to at least one pre-determined recipient.

9. The computer-implemented method of claim 8, wherein the determining, in response to receiving the critical alarm, that the critical alarm is a valid alarm associated with the network element comprises:
   determining the critical alarm is valid when the received critical alarm is found in the alarm library; and
   determining the critical alarm is invalid when the critical alarm is not found in the alarm library, wherein
   the received critical alarm is discarded in response to a determination the received critical alarm is invalid.

10. The computer-implemented method of claim 9, wherein the determining the network element is a valid network element comprises:
    determining the network element is valid when the at least one network element identifier is found in the network inventory library; and
    determining the network element is invalid when the at least one network element identifier is not found in the network inventory library, wherein
    the received critical alarm is discarded in response to a determination that the network element is invalid.

11. The computer-implemented method of claim 8, wherein the determining the critical alarm is a valid alarm is triggered by a Network Management System (NMS) message.

12. The computer-implemented method of claim 8, wherein the determining the network element is a valid network is triggered by an Application Program Interface (API) call.

13. The computer-implemented method of claim 10, wherein at least one of the alarm library associated with the network or the network inventory library associated with the network is stored in a database.

14. The computer-implemented method of claim 13, further comprising:
    connecting an additional network element to the network;
    updating the alarm library to add at least one critical alarm associated with the additional network element; and updating the network inventory library to add at least one network element identifier associated with the additional network element.

15. A non-transitory computer-readable medium for proactive monitoring of a network, storing instructions that, when executed by at least one processor, cause the at least one processor to perform operations comprising:
    receiving, by an element management system connected to the network, from a network element connected to the network, a critical alarm indicative of a potential failure of the network element;
    determining, in response to receiving the critical alarm, that the critical alarm is a valid alarm associated with the network element by comparing the received critical alarm with an alarm library associated with the network;
    determining, in response to receiving the critical alarm, that the network element is a valid network element associated with the network based on at least one network element identifier associated with the network element by comparing the at least one network element identifier of the network element with a network inventory library associated with the network;
    generating, in response to a determination that both the critical alarm and the network element are valid, an incident object by identifying logic response actions for resolving the critical alarm, the incident object comprising data associated with the critical alarm; and
    generating, based on the incident object, a trouble ticket, the trouble ticket comprising data associated with the network element, the critical alarm, and the at least one network element identifier; and
    sending the generated trouble ticket to at least one predetermined recipient.

16. The non-transitory computer-readable medium of claim 15, wherein determining the critical alarm is a valid alarm comprises:
    determining the critical alarm is valid when the received critical alarm is found in the alarm library; and
    determining the critical alarm is invalid when the critical alarm is not found in the alarm library, wherein the received critical alarm is discarded in response to a determination the received critical alarm is invalid.

17. The non-transitory computer-readable medium of claim 16, wherein the determining the network element is a valid network element comprises:
    determining the network element is valid when the at least one network element identifier is found in the network inventory library; and
    determining the network element is invalid when the at least one network element identifier is not found in the network inventory library, wherein
    the received critical alarm is discarded in response to a determination that the network element is invalid.

18. The non-transitory computer-readable medium of claim 15, wherein the determining the critical alarm is a valid alarm is triggered by a Network Management System (NMS) message.

19. The non-transitory computer-readable medium of claim 15, wherein the determining the network element is a valid network element is triggered by an Application Program Interface (API) call.

20. The non-transitory computer-readable medium of claim 17, wherein at least one of the alarm library associated with the network or the network inventory library associated with the network is stored in a database.

* * * * *